United States Patent Office 3,290,265
Patented Dec. 6, 1966

3,290,265
THREE STAGE POLYMERIZATION PROCESS FOR THE PRODUCTION OF POLYVINYL CHLORIDE RESINS
Akira Kaneko, Nakoso, Fukushima, Japan, assignor to Kureha Chemical Industry Co., Ltd., Tokyo, Japan, a corporation of Japan
No Drawing. Filed Nov. 15, 1963, Ser. No. 323,902
Claims priority, application Japan, Nov. 17, 1962, 37/51,564
4 Claims. (Cl. 260—29.6)

The present invention relates to a method for the production of vinyl resins with vinyl chloride and acrylic acid esters as its principal constituents.

It is a principal object of the present invention to provide a method for producing vinyl resins adapted to be used for obtaining molded or formed vinyl articles having the high impact resistance.

Other objects, features and advantages of the present invention will be apparent from the following description.

As publicly well known, polyvinyl chloride polymer (hereinafter called PVC) has widely been used as sheets, films, pipes and other molded articles by reason that said polymer is not only low in cost, but also has the adequate physical properties. However, owing to the brittleness inherent in the PVC, which is its essential defect, there are brought about various disadvantages, for instance, the field for the use of its product is restricted or the loss in the course of the use is high. Accordingly, the enhancement of its impact strength is earnestly requested. To this end, the molding has hitherto been carried out in a blend of PVC with a gummy material. However, the use of such material is restricted due to the fact that the compatibility for PVC, the processability or moldability of the mixture and the resistance to heat and light of the mixture are all low. Further, its mixing takes a long time due to the fact that after the mixing, the gummy material particles as an impact resistance-imparting agent are isolatedly existing in the form of particles different from the PVC particles. Furthermore, in the dry blending which has not preliminarily been subjected to a premolding step, fish eyes, unmelted particles and the like are existing therein, and consequently, there is such a defect as the external appearance of the molded article is impaired.

The present invention is intended to provide a method for the production of vinyl resins, characterized in that vinyl chloride or a mixture having vinyl chloride as its principal constituent and containing other monomer copolymerizable with the vinyl chloride is suspension-polymerized in the presence of an oil soluble catalyst; the resulting suspension-polymer is added with an acrylic acid ester having 4 to 12 carbon atoms in the alkyl group in the course of the polymerization yield of 50 to 90% after the middle period; and after the middle period in regard to the polymerization yield of monomer mixture existing in the system of the monomer mixture after the addition or feeding of said acrylic acid ester, namely, at the time when the polymerization yield has further proceeded up to 50 to 90%, is further added with vinyl chloride or a monomer having vinyl chloride as its principal constituent, and the polymerization is then continued.

The vinyl resin produced by carrying out the present invention can be satisfactorily made up or completed and made easy to process, by adding additive materials used generally in the processing of PVC, such as stabilizer, plasticizer, lubricant, pigment, filler or the like, and carrying out the processing steps, such as calendering, extruding, injecting and the like, and thus, articles having high impact strength and excellent in the external appearance can be obtained.

This invention is further described in detail as follows:

In the first place, the method for suspension-polymerizing vinyl chloride or a mixture having vinyl chloride as its principal constituent and containing other monomer copolymerizable with the vinyl chloride, with an oil soluble catalyst can be realized by applying the suspension polymerization art which is generally known. That is to say, 0.05 to 2.00% by weight of oil soluble catalyst are generally used for vinyl chloride or a monomer mixture having vinyl chloride as its principal constituent. As an oil soluble catalyst there may be used, for instance, lauroyl peroxide, benzoyl peroxide, diisopropyl peroxydicarbonate, azobisisobutyronitrile and the like. The quantity of water as a dispersion medium is preferably used in an amount of 1.5 to 3 times for the total amount of the total monomers after adding 3 times with monomer according to the present invention. When the amount of water to be used is less than 1.5 times, there is the tendency to the agglomeration of suspension-polymerized particles, which is not advisable. The quantity of the suspension agent to be used is sufficient in an amount of 0.05 to 2.00% by weight for the total amount after adding 3 times with monomer. As the kind thereof there may be used, for instance, a suspension agent to be used generally in the suspension polymerization of vinyl resin, such as polyvinyl alcohol (referred to hereinafter as PVA), partially acetified PVA, partially saponificated polyvinyl acetate, methyl cellulose, carboxy methyl cellulose, ethyl cellulose, starch or so forth.

The use of monomer mixture having vinyl chloride as its principal constituent and containing other monomer polymerizable with the vinyl chloride may suitably be selected, depending on the desire of the fluidity, the mechanical properties, the softening point and the like of the finally resulting polymer. For instance, vinyl acetate, vinylidene chloride, acrylic acid ester, methacrylic acid ester, alkyl vinyl ether and the like are exemplified.

Secondly, when the polymerization yield of the monomer in the first polymerization charge has reached the middle period, an acrylic acid ester monomer is fed or added. In the method for the production of vinyl resins according to the present invention, a gummy material containing acrylic acid ester is used as an impact-absorbing agent, and this gummy material is embedded into pores in the suspension particles which are already being formed, and thereafter the outer periphery of the thus embedded gummy material is encompassed with PVC polymer, and thus, the acrylic acid ester polymer, which has an impact-absorbing power to PVC polymer but is lacking in chemical compatibility, can uniformly be embedded into PVC particles in a suitable particle size to absorb the impact. In this way, its purpose is ingeneously accomplished. Such being the case, an addition time or period of acrylic acid ester, which is the second monomer addition or feeding, is an important element for a fine dispersion in particles of acrylic acid ester copolymer which will be produced subsequently. When the polymerization yield of the first monomer is low, no adequate fine dispersion takes place, and accordingly, such is not suitable as an addition time or period, whereas such a condition as the polymerization yield has proceeded too high, is also not appropriate because acrylic acid ester does not penetrate into the particle pores. In view of these relations, after numerous experiments, it has now been found that it is necessary to add or feed the acrylic acid ester to the first monomer, namely vinyl chloride or a monomer having vinyl chloride as its principal constituent at the time when the polymerization yield of the said first monomer falls within the range of 50% to 90%, in order to accomplish the purpose of the present invention. Furthermore, since the acrylic acid ester monomer has for its purpose to be penetrated into PVC particles and polymerized therewith, an oil soluble catalyst may be simultaneously used at the addition time of the acrylic acid ester, but it is evident that even if the catalyst is not especially used, the said ester can also be polymerized by the catalyst which has participated in the polymerization of the first vinyl chloride or monomer having vinyl chloride as its principal constituent.

Acrylic acid ester used herein is meant by acrylic acid alkyl ester and a preferred ester is one that which has 4 to 12 carbon atoms in the alkyl group. If acrylic acid ester containing less than 3 carbon atoms is used, the polymerization after the second monomer addition in the present invention, namely the rubber elasticity of the resulting copolymer after the addition of acrylic acid ester is low and as a result, the impact-absorbing power is small. Accordingly, the purpose of the present invention can not be accomplished. On the contrary, when the number of carbon atoms in acrylic acid ester is more than 13, side chain becomes long chain and bears crystallinity. Similarly, it is impossible to display the rubber elasticity.

As acrylic acid ester having 4 to 12 carbon atoms there may be used, for instance, butyl, hexyl, decyl, octyl, lauryl, isobutyl, 2-ethyl-1-butyl, 3-butyl-1-butyl, 2-methyl pentyl and 2-ethyl-1-hexyl of acrylate.

Thirdly, when, in the polymerization after the addition or feeding of acrylic acid ester, the monomer existing after the addition of the acrylic acid ester has proceeded more than 50% in the polymerization yield, vinyl chloride or a mixture having vinyl chloride as its principal constituent and containing other monomer copolymerizable with the vinyl chloride is further added or fed thereto and the polymerization is continued. This operation has for its purpose to coat further the outer layer of particles containing the acrylic acid ester polymer embedded in a suitable dispersion into spaces of the first vinyl chloride particles with the said vinyl chloride copolymer. The necessity for this coating is based on the following reason.

That is, when the polymerization has come to an end as such by the mere addition of the second monomer addition, the resulted polymer presents a partial exposure of the acrylic acid ester copolymer on its outer layer, and accordingly, in the case where such polymer is subjected as a starting material to the molding step, the slip between particles is too large and the fusion welding or the bonding between particles can not be conducted at all in appearance, and moreover, is not also suitable for the molding. The significance of the third polymerization resides in that particles in such a state are satisfactorily caused to be completed or made up moldable, and the outer layer of the particles is wholly coated with the subsequent vinyl polymer to impart the moldability thereto and further the acrylic acid ester polymer dispersed suitably in the particles produced in the second polymerization is embedded as such by the fusion welding of the vinyl chloride polymer of the outer layer produced by the third polymerization. Accordingly, also in this case, the catalyst may be added, but without any addition of the catalyst, PVC resin which is the object of the present invention and excellent in processability and has a high impact resistance can be obtained by penetrating the catalyst used in the first polymerization into the added monomer up to the outer layer of the particles and effecting continuously the subsequent polymerization.

The fundamental significance of the present invention is to cause the acrylic acid ester polymer having excellent properties as an impact resistance-imparting agent and as a dispersion medium to be existing in a state wherein said ester polymer is physically and uniformly dispersed in the spaces of the vinyl polymer particles produced in the first polymerization.

On the other hand, in the method for molding or processing a mixture consisting of PVC and a copolymer produced from acrylic acid ester and vinyl chloride, a high temperature and a long time are required for making the mixture into a mixed composition having impact strength, and moreover, due to its poor compatibility, the article or product after molding or formation is not only inferior in its outer appearance, but also is extremely whitened by the bending or the impact, which shows that the bonding between both components is not satisfactory. The whitening phenomenon occurring in such a bending, which is a fatal defect of the conventional binary mixture, is scarcely found in the vinyl resin obtained by the method of the present invention. This fact demonstrates that the acrylic acid ester polymer is dispersed in a state wherein said ester polymer is firmly made adhere in the PVC particles, and the molding may be satisfactorily completed.

The necessity for the polymerization due to the suspension polymerization in combination with three steps polymerization in the present invention is based on the necessity for the acrylic acid ester polymer to be dispersed adequately in the particles of the polymer produced by the first polymerization. However, since, for instance, in the emulsion polymerization, it is dispensable for the particle to be less than 1μ, the size for acrylic acid ester to be existing in isolation becomes remarkably small, and as a result, the ester must be finely dispersed, and it comes to an incomplete result after molding or formation.

Further, the order of the three steps polymerization in the present invention will be apparent from the aforesaid illustration. However, let it be assumed that acrylic acid ester is first polymerized in the first polymerization, the suspension-polymerized particles are fused together due to its adherent property, and it is impossible to obtain the formation of particles.

According to the present invention, by reason of the production of acrylic acid ester polymer in the second polymerization, the acrylic acid ester polymer is produced in the PVC particles which are already forming the particle crust, and accordingly, it is possible to produce the suspension particles having a particle size of the same order as that in the normal suspension polymerization. The polymerization temperature is within the range of 10° C. to 80° C., like the case with the suspension polymerization of the general vinyl chloride. If required, it may be possible to add a small amount of a modifier for the polymerization degree, polyfunctional monomer and the like. Furthermore, an emulsifier, fatty acid and the like may also be used as an adjusting agent for grain size distribution of the suspension particles in combination with a small amount of suspension agent.

As hereinbefore set forth, in the present invention, the monomers are added or fed in three divided times, in which case let the total amounts of monomers to be added be 100% by weight, the proportion of the amount of monomer to be added in each addition time is preferred to be in a range as shown in the following Table I:

TABLE I

| | Percent by weight |
|---|---|
| (1) Vinyl chloride or a monomer having vinyl chloride as its principal constituent in the first addition or feeding | 10–50 |
| (2) Acrylic acid ester monomer in the second addition or feeding | 2–30 |
| (3) Vinyl chloride or a monomer having vinyl chloride as its principal constituent in the third addition or feeding | 88–20 |
| Total | 100 |

The invention is further described in the following examples which are illustrative and not limitative thereof.

*Example 1*

20 parts of vinyl chloride, 250 parts of water, 0.3 part of PVA and 0.1 part of azobisisobutyronitrile were charged in an autoclave with stirrer, and then added with 7.5 parts of octyl acrylate after 3 hours polymerization at 58° C.

At the time of the addition of octyl acrylate, the polymerization of the vinyl chloride proceeded in the yield up to about 70%. After the addition of the octyl acrylate, 72.5 parts of vinyl chloride were added after further polymerization for 15 hours at 58° C. to proceed the polymerization. Just before the addition of 72.5 parts of vinyl chloride, the polymerization yield of the monomer after the second addition of acrylic acid was about 85%. The polymerization was further continued for 16 hours at 58° C. after the addition of 72.5 parts of vinyl chloride and thus, the polymerization was completed.

The thus produced polymer withdrawn after the polymerization was added with 2% of organo tin stabilizer and rolled for 7 min. for 150° C. The impact strength of a test piece formed at 185° C. by pressing the thus rolled product was measured by the Charpy impact testing method on notched bars of JIS K6745 (Rigid PVC—plate rating) and the measured result was as follows:

Charpy impact strength—92.8 kg. cm./cm.$^2$

On the other hand, the impact strength of PVC obtained by a single polymerization of vinyl chloride at 58° C. was 6.8 kg. cm./cm.$^2$, and the impact strength of copolymer obtained by the suspension polymerization at 58° C. of 82.5 parts of vinyl chloride and 7.5 parts of octyl acrylate was 6.2 kg. cm./cm.$^2$.

*Example 2*

18 parts of vinyl chloride, 2 parts of vinyl acetate, 0.2 part of PVA, 0.4 part of lauroyl peroxide and 250 parts of water were charged in an autoclave with stirrer, and suspension-polymerized for 4 hours at 57° C., after which 8 parts of decyl acrylate were charged in the autoclave and then the polymerization was further caused to proceed at 57° C. for 16 hours. After the addition of 64.8 parts of vinyl chloride and 7.2 parts of vinyl acetate, the polymerization was further caused to proceed for 15 hours at the same temperature, and thus, a copolymer was obtained which contains vinyl chloride, vinyl acetate and decyl acrylate.

The yields at the time of addition of each monomer in the course of the polymerization were as follows:

At the time of addition of decyl acrylate, the polymerization yield of the vinyl chloride and vinyl acetate monomers, which were, in the first place, charged, was caused to proceed up to about 80%, and immediately before the addition of 64.8 parts of vinyl chloride and 7.2 parts of vinyl acetate, the monomer mixture after the addition of decyl acrylate was in a state of the polymerization yield of about 85%.

The polymer thus obtained was added with 2% of organo tin stabilizer in the same manner as in Example 1. The impact strength of a test piece taken from the above-mentioned product was measured by the Charpy impact testing method of JIS K6745, like the case with Example 1, Charpy impact strength of 113.5 kg. cm./cm.$^2$ was obtained.

On the other hand, the impact strength of ternary copolymer produced from the first by using the monomers in this Example 2, namely the ternary copolymer obtained by charging, from the first, simultaneously 82.8 parts of vinyl chloride, 9.2 parts of vinyl acetate and 8 parts of decyl acrylate and suspension-polymerizing the charge was only 5.8 kg. cm./cm.$^2$

What is claimed is:

1. A method for the production of vinyl resins which comprises suspension-polymerizing a monomeric material (A) selected from the group consisting of vinyl chloride and mixtures of vinyl chloride with a minor amount of a monomer copolymerizable therewith in the presence of an oil soluble catalyst in a first stage, then, in a second stage, adding an alkyl acrylate monomer having 4 to 12 atoms in the alkyl group to the suspension polymerization mixture when the polymerization yield of said suspension polymerization in the first stage has reached 50 to 90% and, in a third stage, adding a further quantity of said monomeric material (A) to the suspension polymerization mixture when the polymerization yield of the monomer mixture present in the second stage has reached 50 to 90% and, continuing the polymerization, wherein the first feeding of monomeric material (A) is within the range of 10% to 50%, based on the total composition; the second feeding of acrylic acid ester monomer is within the range of 2% to 30% and the third feeding of further monomeric material (A) is within the range of 88% to 20%, whereby a graft polymer particle structure is obtained in which the particles of the polymer of monomeric material (A) produced in the first stage are penetrated and copolymerized with the alkyl acrylate in the second stage and the resulting particles are coated with the copolymer of monomeric material (A) produced in the third stage.

2. A method for the production of vinyl resins as defined in claim 1, wherein the oil soluble catalyst is a member selected from the class consisting of lauroyl peroxide, benzoyl peroxide, diisopropyl peroxydicarbonate and azobisisobutyronitrile.

3. A method for the production of vinyl resins as defined in claim 1, wherein the acrylic acid ester is an ester selected from the group consisting of butyl hexyl acrylate, decyl acrylate, octyl acrylate, lauryl acrylate, isobutyl acrylate, 2-ethyl-1-butyl acrylate, 3-butyl-1-butyl acrylate, 2-methyl-1-pentyl acrylate and 2-ethyl-1-hexyl acrylate.

4. A method for the production of vinyl resins as defined in claim 1, wherein the polymerization temperature is within the range of 10° C. to 80° C.

References Cited by the Examiner

UNITED STATES PATENTS

| | | | |
|---|---|---|---|
| 2,746,944 | 5/1956 | Naps et al. | 260—884 |
| 2,994,682 | 8/1961 | Hammon et al. | 260—884 |
| 3,019,208 | 1/1962 | Reid et al. | 260—29.6 |
| 3,206,424 | 9/1965 | Heinrich et al. | 260—884 |

MURRAY TILLMAN, *Primary Examiner.*

J. T. GOOLKASIAN, *Assistant Examiner.*